Feb. 8, 1955         C. C. MAU         2,701,428
ANIMAL TRAP

Filed Nov. 15, 1952         2 Sheets-Sheet 1

INVENTOR.
CLAYTON C. MAU
BY Harold E. Stonebraker
his ATTORNEY

INVENTOR.
CLAYTON C. MAU

United States Patent Office 2,701,428
Patented Feb. 8, 1955

2,701,428
ANIMAL TRAP
Clayton C. Mau, Geneseo, N. Y.

Application November 15, 1952, Serial No. 320,786

8 Claims. (Cl. 43—90)

This invention relates to an animal trap of the type including a pair of pivotally connected generally rectangular loop-shaped coacting spring-actuated jaws, and it has for its purpose to afford a practical and effective trap that is of simple and economical construction and which can be easily manipulated for trapping muskrats, skunks, and other small animals.

The present invention is in the nature of an improvement on the construction disclosed in my Patent No. 2,564,811, dated August 21, 1951, which employs a wire actuating spring of approximately the length of the trap including arms supported on and movable along end portions of the jaws and foldable around the end portions when the trap is set, and a particular purpose of the invention is to so arrange the actuating spring in relation to the jaws that when folded around the end portions, the arms and free end of the spring extend upwardly and occupy positions between the side portions of the jaws and above the trigger mechanism when the trap is set, making it practically impossible for an animal to gain access to the trigger from the top of the trap between the jaws or from any position except one in which his neck or body is in position between the gripping portions of the jaws, thus rendering it unlikely for an animal to spring the trap in any manner without being caught.

Another object is to afford means for anchoring the trap more securely than was possible in the patented construction, and in any position in which it may desirably be located, either on the ground, in a hole, or fastened to a log, post, tree, or other object.

Still a further purpose of the invention is to provide a wire actuating spring with a coiled portion at its free outer end and arranging the spring in relation to the jaws so that when the trap is set and the spring is swung upwardly over the trigger mechanism and between the side portions of the jaws, the trap can be anchored to the ground by inserting a stake or rod of suitable material through the coiled portion at the free end of the actuating spring and a rotatable eye extending from the pivotal connection between the outer end portions of the jaws opposite to where the spring is connected to the jaws, the eye and coiled portion of the spring being in alinement to receive such anchoring means.

An additional purpose of the invention is to provide a rotatable eye at the pivotal connection between the jaws at their inner end portions where the actuating spring is connected, such eye being arranged between the arms of the spring and extending away from the trap sufficiently to clear the arms when the spring is moved upwardly to a position over the trigger mechanism and between the side portions of the jaws when the trap is set, thus affording means to receive a second stake or rod of suitable material for anchoring the trap to the ground so that it can be secured at both ends through anchoring means engaging the trap at three different points, or by the chain secured to the eyes and drawn around a tree or other object thus holding it securely against accidental or unintentional movement and effectively preventing an animal from moving the trap from its original location.

Still another object of the invention is to construct the trap from jaws which are symmetrical, each jaw extending inwardly of the other jaw at one end and outwardly of such other jaw at the opposite end, thus reducing the cost of production and contributing to a sturdier and more efficient structure.

To these and other ends, the invention consists in the construction and arrangement of parts that will appear clearly from the following description when read in conjunction with the accompanying drawings, the novel features being pointed out in the claims following the specification.

Figure 2:
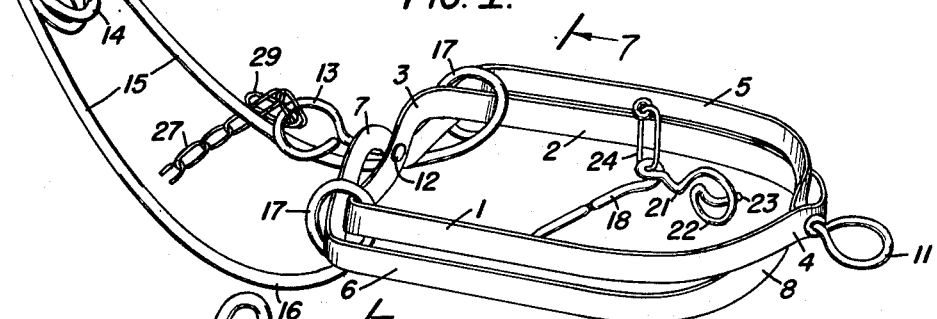
Fig. 2 is a perspective view looking in the opposite direction to that of Fig. 1.
Figure 3:
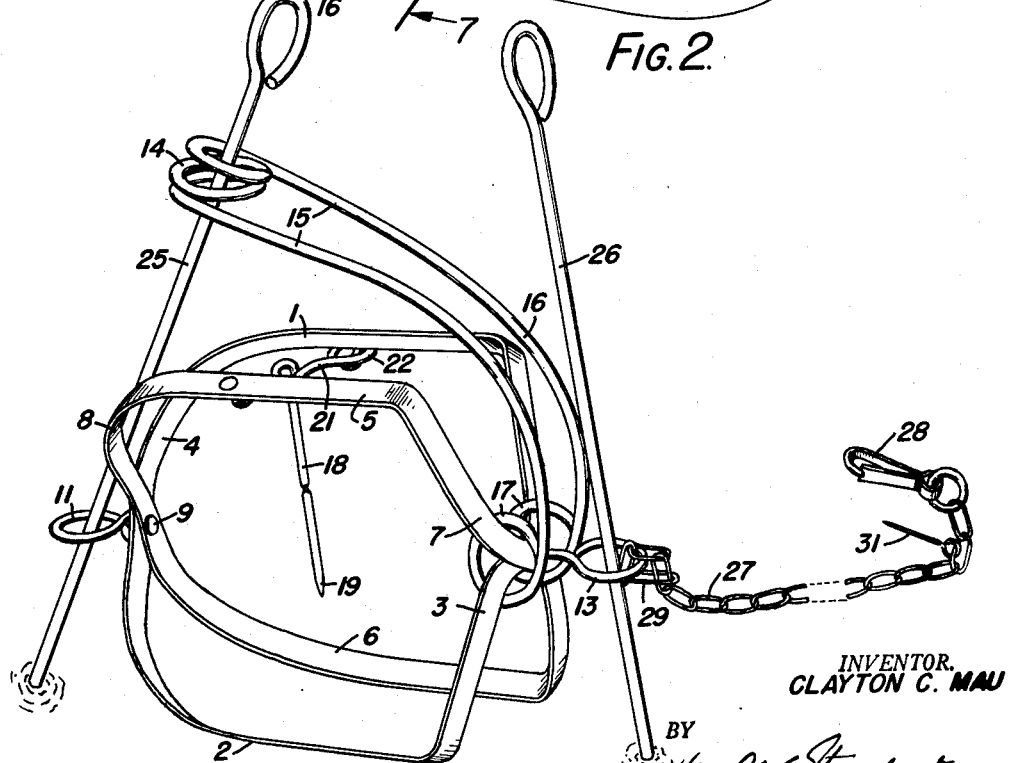
Figure 5:
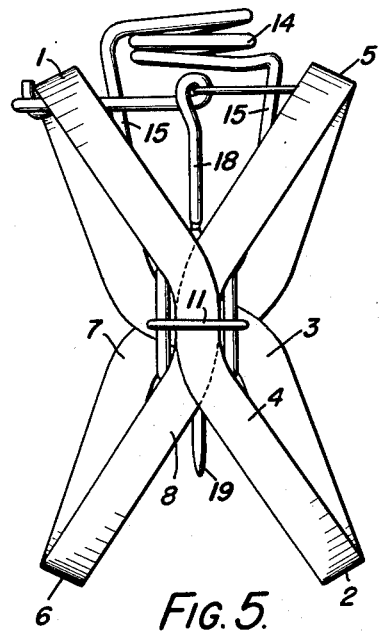
Figure 6:
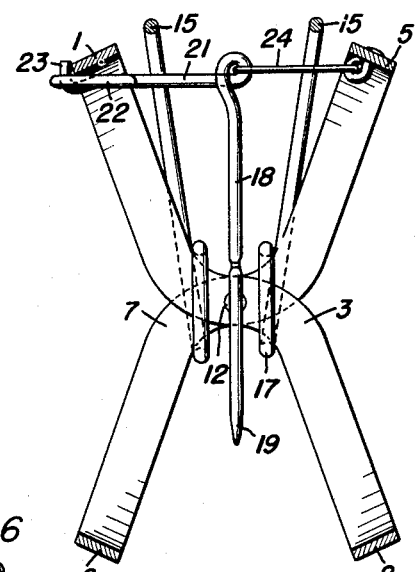
Figure 4:
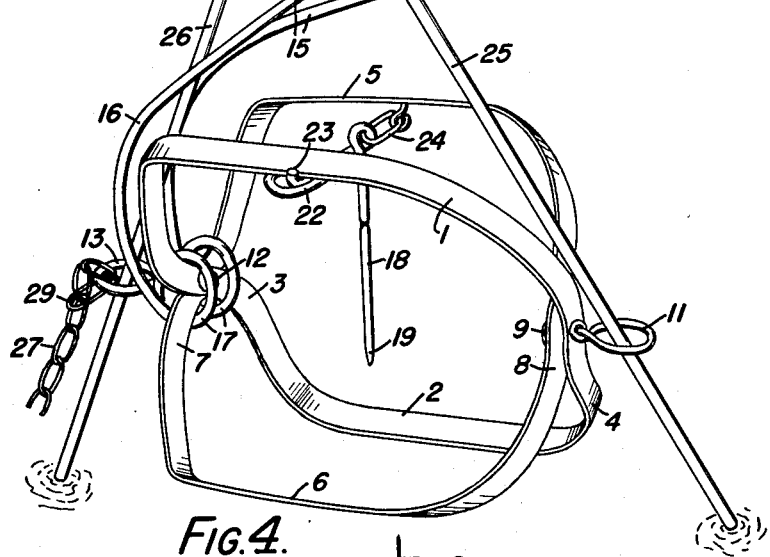
Figure 7:
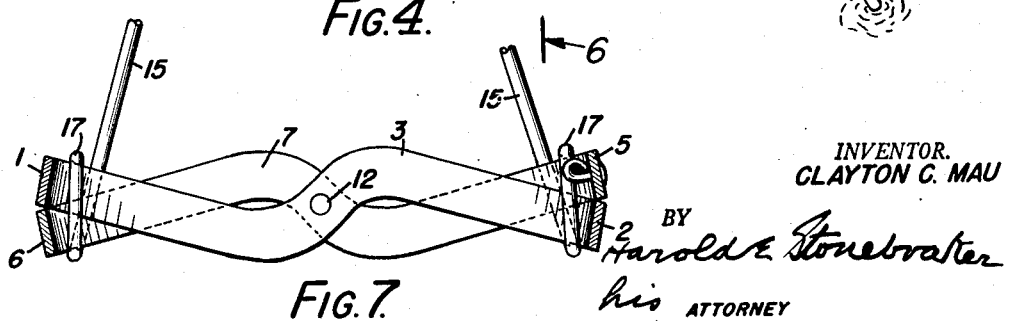

Fig. 3 is a perspective view showing the position of the parts when the trap is set with the actuating spring swung to its upper position above the trigger mechanism and between the side portions of the jaws, and anchoring means engaged through the coiled portion of the spring and the eye at the outer ends of the jaws, and additional anchoring means engaged through the eye at the inner ends of the jaws;

Fig. 4 is a perspective view looking in the opposite direction to that of Fig. 3;

Fig. 5 is an end view of the trap in set position, with the spring in its upper position, looking from right to left of Fig. 4;

Fig. 6 is a vertical sectional view taken on line 6—6 of Fig. 4, looking in the direction indicated, and Fig. 7 is a sectional view on line 7—7 of Fig. 2 looking in the direction indicated.

Referring more particularly to the drawings in which like reference numerals throughout the several views refer to the same parts, there are provided symmetrical jaws which are pivotally connected and are of generally rectangular loop-shaped formation. One of said jaws includes side portions 1 and 2 and reversely curved end portions 3 and 4 connecting said side portions, while the pivotally connected cooperating jaw includes side portions 5 and 6, and reversely curved end portions 7 and 8 connecting said side portions, the reversely curved outer end portions 4 and 8 being pivotally connected together, and the reversely curved inner end portions 3 and 7 being pivotally connected together in the manner that will be described presently.

Figure 1:
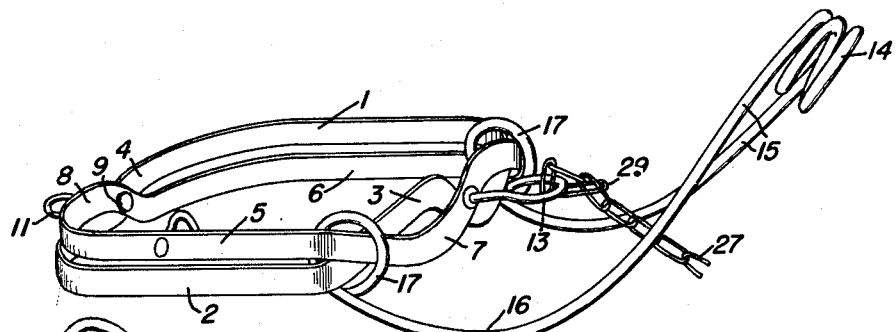
Fig. 1 is a perspective view of a trap constructed in accordance with a preferred embodiment of the invention and showing the normal position of the parts before the trap is set, with the arms of the actuating spring in their outermost positions on the jaws.

The jaws are so formed that when in normal released position, the cooperating gripping edges of the side portions 1 and 6 lie one upon the other and similarly the adjacent gripping edges of the side portions 2 and 5 lie one upon the other as shown in Figs. 1 and 2, while the reversely curved end portions 3 and 4 of one jaw extend respectively inwardly and outwardly of the reversely curved portions 7 and 8 of the other jaw.

The outer end portions 4 and 8 of the jaws are pivotally connected by a pin 9 which has its outer end formed to provide a rotatable eye 11, while the inner end portions 3 and 7 of the jaws are pivotally connected by a pin 12 that is extended and formed to provide a rotatable eye 13 located beyond the inner end portions of the jaws for a purpose that will be described presently.

The jaws are actuated when released to their normal or inactive positions by an actuating spring which includes a coiled portion 14, at its outer or free end and arms 15 which are bent intermediate the inner and outer ends of the spring as indicated at 16, and formed at their inner ends with loops or connecting portions 17 each of which embraces an inner end portion of one jaw and is slidable from a position against the side portion of the jaw when the trap is sprung, as in Figs. 1 and 2, to a position adjacent the pivotal connection between the jaws, as indicated in Figs. 3 and 4, when the trap is set and the jaws open, at which time the arms 15 of the spring and coil 14 can be swung upwardly to a position above the trigger mechanism and between the side portions of the jaws, as shown in Figs. 3 and 4. When in this position, the spring serves as a barrier above and between the trigger mechanism and jaws and effectually prevents an animal from reaching or stepping between the side portions of the jaws at the top or otherwise springing the trap accidentally, and compelling the animal to enter the trap from one side to reach the bait on the trigger, or the trigger. Thus the animal must be between the gripping edges of the trap before it can be sprung.

The trap is held in set position by trigger mechanism similar to that disclosed in the aforesaid Patent No. 2,564,811, and consisting of a trigger 18 having a pointed end 19 to receive the bait and terminating at its opposite end in an arm 21, see Fig. 6, which has connected thereto an integral circular portion 22 provided at its extremity with a detent or latch 23, the trigger being connected to the side portion 5 of one of the jaws by the link 24.

The trap is set by forcing together the side portions or arms 15 of the spring, moving them from the position illustrated in Figs. 1 and 2 to the position illustrated in Figs. 3 and 4, whereupon the jaws can be opened as in Figs. 3 and 4 and the detent 23 swung upwardly into engagement with the side portion 1 of the jaw, and when trigger 18 is moved laterally by the animal pressing against same or grabbing the bait on the end 19, detent 23 is pulled downwardly, releasing the jaws which are then actuated by the arms of the spring moving outwardly on the jaws to bring the gripping edges of the jaws into engagement with the neck or body of the animal.

When the trap is set, it can be supported on the ground with the portions 2 and 6 of the jaws resting on the ground while the trigger mechanism is then at the top of the trap above the ground and the actuating spring is folded upwardly over the top of the trap and between the side portions of the jaws, as shown in Figs. 3 to 5 inclusive. When reference is made throughout the specification and claims to the top of the trap, this is to be understood as referring to the top with reference to the position of the trap as shown in Figs. 3 and 4, although the trap may be otherwise positioned in a hole or on a tree, log, post, or suitable object. This arrangement serves to protect the actuating spring from being affected by water, mud, snow, or ice as it would be if located on the underside of the trap when the latter is set and positioned in a hole or on the ground as in Figs. 3 and 4.

When thus positioned, the coiled portion 14 of the spring and eye 11 are in alinement and in order to anchor the trap, a stake or rod of suitable material 25 can be inserted through the coiled portion 14 of the actuating spring and thence through the eye 11 at the end of the trap and driven into the ground, while a second stake or rod of suitable material 26 can also be inserted through eye 13 into the ground. Thus the trap is securely held against accidental or unintentional movement and is prevented from being dragged away from its original position. The eye 13 is arranged so that when the actuating spring is in its upper position, as in Figs. 3 and 4, the eye 13 extends between and beyond the connecting portions 17 and arms of the spring, so that a stake can be inserted therethrough without interference with the connecting portions and arms of the spring.

The trap when set in the manner described may also be positioned in a hole in any desired position or can be fastened on a log, tree stump, or other object and for this purpose held in place by a detachable chain 27 provided with a snap fastener 28 at one end and a ring or link 29 at its other end of such size as to enable its passing through the eye 11 or eye 13, while the snap fastener 28 is of a size that permits its passing through the link 29. Thus the chain can be inserted through the eye 11 or eye 13 of the trap and snap fastener 28 inserted through the link 29 and drawn tightly.

Snap fastener 28 can be attached to any stationary object, or the chain can be extended around a tree trunk or the like and brought through the eye at the opposite end of the trap and the snap fastener secured to any convenient link of chain or otherwise, following which the chain can be tightened suitably by turning either or both of the eyes 11 and 13 to any desired extent, thereby twisting the chain on itself and in this manner shortening it sufficiently to hold the trap firmly in proper position against a tree, post, or other support when it is not in contact with the ground. The chain 27 can also be secured to either eye or to the spring, and to any suitable anchorage as additional fastening means when the trap is set on the ground and secured by stakes through eyes. 31 designates a pin carried by the chain 27 and enabling fastening the same to a tree trunk or the like when desired.

While the invention has been described with reference to the structure shown herein, it is not confined to the particular details set forth, and this application is intended to cover such changes or departures as may come within the purposes of the improvement and the scope of the following claims.

I claim:

1. An animal trap comprising a pair of loop-shaped jaws including cooperating side portions having gripping edges, inner and outer end portions which are pivotally connected at their centers, trigger mechanism connected to one of said side portions and including a detent engageable with the corresponding side portion of the other jaw and holding the gripping edges in spaced relation, a wire actuating spring including a coiled portion at its outer end and arms terminating at their inner ends in connecting portions that embrace and are slidable on the inner end portions of the jaws on opposite sides of the pivotal connection at the inner end portions of the jaws, said arms of the actuating spring being curved upwardly away from said end portions and the actuating spring being swingable upwardly on said end portions with its arms positioned adjacent to the trigger mechanism and adjacent to and between the side portions with which said trigger mechanism is connected when the trap is set and supported on the opposite side portions, and acting when in such position to prevent entry of an animal in the area between the side portions spanned by said trigger mechanism.

2. An animal trap comprising a pair of loop-shaped symmetrical jaws including cooperating side portions having gripping edges, inner and outer end portions which are pivotally connected at their centers, the end portions of one jaw extending inwardly and outwardly respectively of the end portions of the other jaw, trigger mechanism connected to one of said side portions and including a detent engageable with the corresponding side portion of the other jaw and holding the gripping edges in spaced relation, a wire actuating spring including a coiled portion at its outer end and arms terminating at their inner ends in connecting portions that embrace and are slidable on the inner end portions of the jaws on opposite sides of the pivotal connection, at the inner end portions of the jaws said arms of the actuating spring being curved upwardly away from said end portions and the actuating spring being swingable upwardly on said end portions with its arms positioned adjacent to the trigger mechanism and adjacent to and between the side portions with which said trigger mechanism is connected when the trap is set and supported on the opposite side portions and acting when in such position to prevent entry of an animal in the area between the side portions spanned by said trigger mechanism.

3. An animal trap comprising a pair of loop-shaped jaws including cooperating side portions having gripping edges, inner and outer end portions, pivotal connections at the centers of said end portions, trigger mechanism connected to one of said side portions and including a detent engageable with the corresponding side portion of the other jaw and holding the gripping edges in spaced relation, a wire actuating spring including a coiled portion at its outer end and arms terminating at their inner ends in connecting portions that embrace and are slidable on the inner end portions of the jaws on opposite sides of the pivotal connection at the inner end portions of the jaws, a rotatable eye forming part of the pivotal connection at the outer ends of the jaws, said arms of the actuating spring being curved upwardly away from said end portions and the actuating spring being swingable upwardly on said end portions with the arms positioned above the trigger mechanism immediately over and between said side portions with which the trigger mechanism is connected when the trap is set, said spring acting when in such position to prevent entry of an animal in the area between said side portions spanned by said trigger mechanism, and said coiled portion of the spring and said eye being positionable in alinement whereby to receive a ground-anchoring stake.

4. An animal trap comprising a pair of loop-shaped symmetrical jaws including cooperating side portions having gripping edges, inner and outer end portions, pivotal connections at the centers of said end portions, the end portions of one jaw extending inwardly and outwardly respectively of the end portions of the other jaw, trigger mechanism connected to one of said side portions and including a detent engageable with the corresponding side portion of the other jaw and holding the gripping edges in spaced relation, a wire actuating spring including a coiled portion at its outer end and arms terminating at their inner ends in connecting portions that embrace and are slidable on the inner end portions of the jaws on opposite sides of the pivotal connection at the inner end portions of the jaws, a rotatable eye forming part of the pivotal connection at the outer ends of the jaws, said arms of the actuating spring being curved upwardly away from said end portions and the actuating spring being swingable upwardly on said end portions with its arms positioned above the trigger mechanism immediately over and between said side portions with which the trigger mechanism is connected when the trap is set, said spring acting when in such position to prevent entry of an animal in the area between said side portions spanned by said trigger mechanism, and said coiled portion of the spring and said eye being positionable in alinement whereby to receive a ground-anchoring stake.

5. An animal trap comprising a pair of loop-shaped jaws including cooperating side portions having gripping edges, inner and outer end portions, pivotal connections at the centers of said end portions, trigger mechanism connected to one of said side portions and including a detent engageable with the corresponding side portion of the other jaw and holding the gripping edges in spaced relation, a wire actuating spring including a coiled portion at its outer end and arms terminating at their inner ends in connecting portions that embrace and are slidable on the inner end portions of the jaws on opposite sides of the pivotal connection at the inner end portions of the jaws, said arms of the actuating spring being curved upwardly away from said end portions and the actuating spring being swingable upwardly on said end portions with its arms positioned above the trigger mechanism immediately over and between said side portions with which said trigger mechanism is connected when the trap is set, said spring acting when in such position to prevent entry of an animal in the area between said side portions spanned by said trigger mechanism, and a rotatable eye forming part of the pivotal connection at the inner end portions of the jaws and extending to a point between and beyond said arms when the spring is in its upper position whereby to receive a ground-anchoring stake.

6. An animal tap comprising a pair of loop-shaped symmetrical jaws including cooperating side portions having gripping edges, inner and outer end portions, pivotal connections at the centers of said end portions, the end portions of one jaw extending inwardly and outwardly respectively of the end portions of the other jaw, trigger mechanism connected to one of said side portions and including a detent engageable with the corresponding side portion of the other jaw and holding the gripping edges in spaced relation, a wire actuating spring including a coiled portion at its outer end and arms terminating at their inner ends in connecting portions that embrace and are slidable on the inner end portions of the jaws on opposite sides of the pivotal connection at the inner end portions of the jaws, said arms of the actuating spring being curved upwardly away from said end portions and the actuating spring being swingable upwardly on said end portions with its arms positioned above the trigger mechanism immediately over and between said side portions with which said trigger mechanism is connected when the trap is set, said spring acting when in such position to prevent entry of an animal in the area between said side portions spanned by said trigger mechanism, and a rotatable eye forming part of the pivotal connection at the inner end portions of the jaws and extending to a point between and beyond said arms when the spring is in its upper position whereby to receive a ground-anchoring stake.

7. An animal trap comprising a pair of loop-shaped jaws including cooperating side portions having gripping edges, inner and outer end portions, pivotal connections at the centers of said end portions, trigger mechanism connected to one of said side portions and including a detent engageable with the corresponding side portion of the other jaw and holding the gripping edges in spaced relation, a wire actuating spring including a coiled portion at its outer end and arms terminating at their inner ends in connecting portions that embrace and are slidable on the inner end portions of the jaws on opposite sides of the pivotal connection at the inner end portions of the jaws, said arms of the actuating spring being curved upwardly away from said end portions and the actuating spring being swingable upwardly on said end portions with its arms positioned above the trigger mechanism immediately over and between said side portions with which said trigger mechanism is connected when the trap is set, said spring acting when in such position to prevent entry of an animal in the area between said side portions spanned by said trigger mechanism, a rotatable eye forming part of the pivotal connection at the outer end portions of the jaws, a rotatable eye forming part of the pivotal connection at the inner end portions of the jaws, said last mentioned eye extending to a point between and beyond said arms when the spring is in its upper position whereby to receive a ground-anchoring stake and the first mentioned eye and coiled portion of the spring being in alinement whereby to receive therethrough a ground-anchoring stake.

8. An animal trap comprising a pair of loop-shaped symmetrical jaws including cooperating side portions having gripping edges, inner and outer end portions, pivotal connections at the centers of said end portions, the end portions of one jaw extending inwardly and outwardly respectively of the end portions of the other jaw, trigger mechanism connected to one of said side portions and including a detent engageable with the corresponding side portion of the other jaw and holding the gripping edges in spaced relation, a wire actuating spring including a coiled portion at its outer end and arms terminating at their inner ends in connecting portions that embrace and are slidable on the inner end portions of the jaws on opposite sides of the pivotal connection at the inner end portions of the jaws, said arms of the actuating spring being curved upwardly away from said end portions and the actuating spring being swingable upwardly on said end portions with its arms positioned above the trigger mechanism immediately over and between said side portions with which said trigger mechanism is connected when the trap is set, said spring acting when in such position to prevent entry of an animal in the area between said side portions spanned by said trigger mechanism, a rotatable eye forming part of the pivotal connection at the outer end portions of the jaws, a rotatable eye forming part of the pivotal connection at the inner end portions of the jaws, said last mentioned eye extending to a point between and beyond said arms when the spring is in its upper position whereby to receive a ground-anchoring stake and the first mentioned eye and coiled portion of the spring being positionable in alinement whereby to receive therethrough a ground-anchoring stake.

References Cited in the file of this patent

UNITED STATES PATENTS

| Number | Name | Date |
|---|---|---|
| 820,640 | Gabrielson | May 15, 1906 |
| 1,970,672 | Prestenback | Aug. 21, 1934 |
| 2,564,811 | Mau | Aug. 21, 1951 |